(12) United States Patent
Bliem (10) Patent No.: US 8,924,438 B2
(45) Date of Patent: Dec. 30, 2014

(54) USAGE RECORD ENHANCEMENT AND ANALYSIS

(75) Inventor: Alex Eugene Bliem, Manassas, VA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1014 days.

(21) Appl. No.: 12/617,450

(22) Filed: Nov. 12, 2009

(65) Prior Publication Data

US 2011/0113045 A1    May 12, 2011

(51) Int. Cl.
*G06F 17/30*     (2006.01)
*G06Q 10/10*     (2012.01)

(52) U.S. Cl.
CPC ..................................... *G06Q 10/10* (2013.01)
USPC ........................................................ 707/821

(58) Field of Classification Search
USPC ......................................................... 707/821
See application file for complete search history.

(56) References Cited

U.S. PATENT DOCUMENTS

| | | | |
|---|---|---|---|
| 2002/0133721 A1* | 9/2002 | Adjaoute | 713/201 |
| 2007/0106582 A1* | 5/2007 | Baker et al. | 705/35 |
| 2007/0124246 A1* | 5/2007 | Lawyer et al. | 705/50 |
| 2009/0307778 A1* | 12/2009 | Mardikar | 726/26 |

* cited by examiner

*Primary Examiner* — Mahesh Dwivedi (57) ABSTRACT

A system may include a database server configured to store at least one enrichment file. The system may further include a usage data server including an enrichment process configured to receive a plurality of usage records representative of a plurality of subscriber communications over a communications network, receive an enrichment file from the database server including additional information regarding network activity, and enrich at least a portion of the usage records according to the enrichment file.

24 Claims, 10 Drawing Sheets

```
SECTION:MAIN
VERSION:1002083RB
DLL:FSEMAP
MODE:BEFORE
#Filter to make sure we have CIC, TG# has not been already written
#and call direction is outgoing

SECTION:FILTER
NAME:TG_# from CIC
EXPR:A AND B and C
COND:A:CIC:<>:NULL
COND:B:TG_#:=:NULL
COND:C:Direction:=:Outgoing

SECTION:MAPPING
INPUT:OPC;DPC;~CIC
OUTPUT:TG_#
DEFAULT:NULL

MAP:235-111-4;251-173-11;1101~1124:552
MAP:2-41-8;235-16-30;2101~3272:5030
MAP:235-111-4;240-12-1;1001~1148:346
MAP:2-41-3;251-167-22;1101~1148:562
MAP:2-41-6;250-34-5;1101~1124:898
```

```
SECTION:MAIN
VERSION:1124083RB
DLL:FSEMAP
MODE:BEFORE
#Filter to make sure we have a TG#
#and O_NAME and the call direction is outgoing
#O_Name should = fGNI office name
SECTION:FILTER
NAME:D_CLLI_FromOffc_TG
EXPR:A_AND_B_and_C
COND:A:TG_#:<>:NULL;0
COND:B:O_NAME:<>:NULL
COND:C:Direction:=:Outgoing

SECTION:MAPPING
INPUT:O_NAME;TG_#
OUTPUT:D_CLLI
DEFAULT:NULL

MAP:dllatx37;339:COMOTXXADS0
MAP:pitdpaasgs0;324:PITBPAOKDS1
MAP:chcsilhrgt1;1528:HBRNINXH01t
```

Query Application 160

| CLLI | Host | Min TCIC | OPC | Trunk Group Type |
|---|---|---|---|---|
| CMBRAMAWI01T | | | | |

[Clear] [Query]

| Far End CLLI | TG | Max TCIC | DPC | Remarks |
|---|---|---|---|---|
| | 224 | | | |

[Export]

Record Count 1

| CLLI | Host | TYPE | TG | CLLI | REMARKS | DPC | OPC | MINTCIC | MAXTCIC | CIC | MG | TRKTYPE |
|---|---|---|---|---|---|---|---|---|---|---|---|---|
| CMBRMAWI01T | CMBRMAWI01T | 5ESS | 224 | SPFDMAWODS2 | EO_AQ117876 | 247-61-42 | 5-38-52 | 101 | 396 | 6963 | 0 | EO |

805 (top section)
810 (bottom section)

Fig. 8

Query Application
160

Country
[Jamaica ▼]

Date Added
[      ▼]

Blocked
[      ▼]

[Clear]
[Query]
[Export]

⎫
⎬ 805
⎭

Record Count: 5

| Request Type | Country | Starting Number | Ending Number | Date Added | Blocked For |
|---|---|---|---|---|---|
| NADP | Jamaica | 876-555-3278 | | 3/3/2009 | Wireless |
| NADP | Jamaica | 876-555-4426 | | 3/6/2009 | Wireless |
| NADP | Jamaica | 876-555-7564 | | 4/1/2009 | Wireless |
| NADP | Jamaica | 876-555-9223 | | 1/15/2009 | Wireless |
| NADP | Jamaica | 876-555-9856 | | 2/6/2009 | Wireless |

USAGE RECORD ENHANCEMENT AND ANALYSIS

BACKGROUND

As communications systems have become more complex, ensuring that the system is functioning properly and being put to proper use has become increasingly difficult. For example, detecting fraudulent use of a communication device such as a telephone or the troubleshooting of their networks have become increasingly difficult issues for communications providers to address. In many cases, the information necessary to determine operational errors or abuses may not be logged. In other cases, information may be logged but may not be readily available or in a usable form. Accordingly, a communications provider may not have the proper information available to use to diagnose and address such issues within a communications system.

DETAILED DESCRIPTION

A provider of wired or wireless communications services (e.g., telephony, VoIP, Internet, etc.) may record information regarding aspects of services rendered to subscribers of the communications system. These records may be referred to as usage records. A usage record may be produced by a device or devices on a communications network, and may include information regarding one or more details of a communication of a subscriber. Usage records may be transported to one or more collection points for aggregation and processing. Accordingly, aggregated usage records may include information for each communication made by a subscriber.

Additional reported information regarding communications and the communications network may be collected. These reports may be transported to one or more collection points for aggregation and processing. The aggregated report information may be matched to the usage records and may be used to "enrich" the usage records with additional information. In some instances, fields of the usage records may be populated to include the report information from the one or more data sources. Moreover, fields of the usage records may build upon one another, and may be populated based on other fields, including fields populated based on the report information.

By enriching the usage records with matched report information, queries may be performed on the additional fields of the enriched records. These additional fields may be queried by a communications provider to allow for determinations to be made that may not be otherwise possible.

Additionally, substantially the same report information that may used to enrich the usage records may further be queried by the communications provider. This information may be queried to allow for the communications provider to troubleshoot operational issues with the communications network and to determine instances of fraudulent use over the network.

Figure 1:
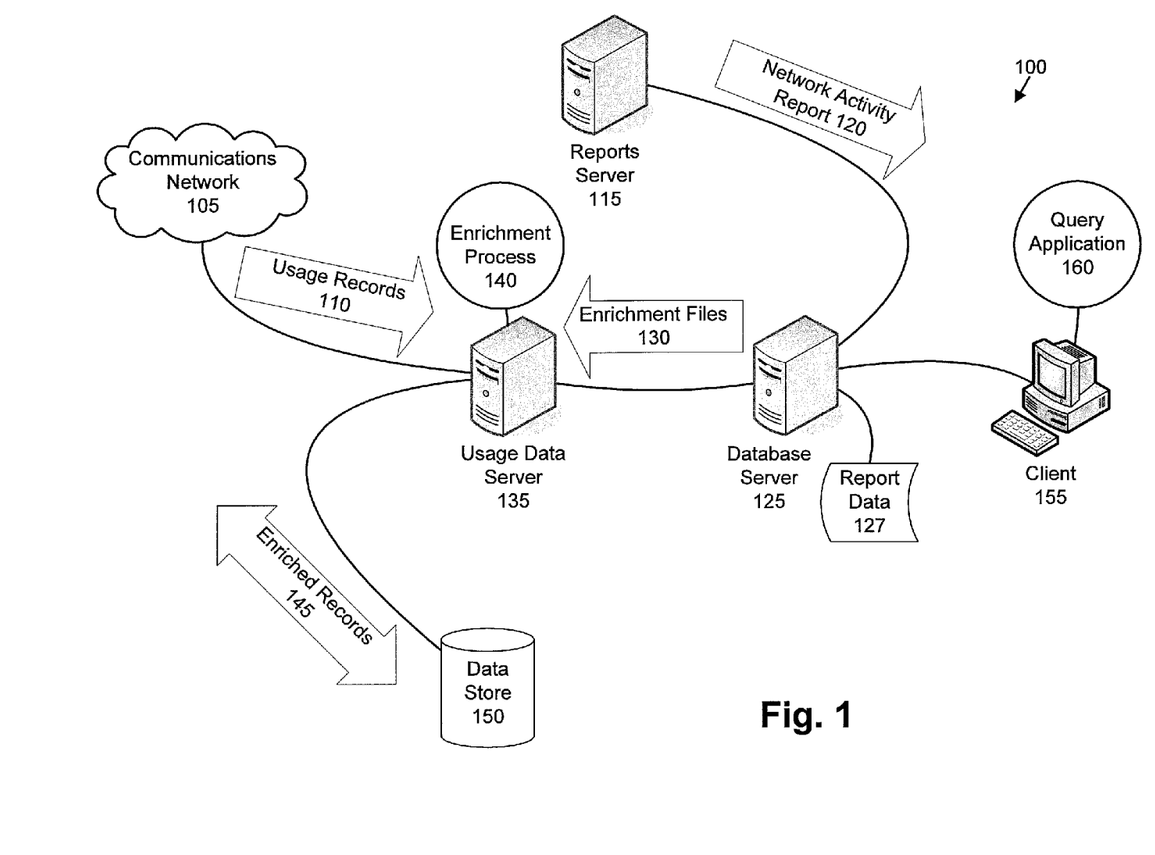
FIG. 1 illustrates an exemplary communications system for the enrichment of usage records and the analysis of report data.

FIG. 1 illustrates an exemplary communications system 100 for the enrichment of usage records 110 and the analysis of report data 127. A communications network 105 may be configured to provide the usage records 110. A reports server 115 may be configured to provide network activity reports 120 to a database server 125. The database server 125 may be configured to receive the network activity reports 120, to compile and store report data 127, and to generate and provide enrichment files 130. The usage data server 135 may include an enrichment process 140 configured to receive usage records 110 from the communications network 105 and to receive enrichment files 130 from the database server 125. The enrichment process 140 may further be configured to enrich the usage records 110 to create enriched records 145 using the enrichment files 130, and to store the enriched records 145 in a data store 150. A client 155 may include a query application 160 configured to query the database server 125 and analyze the report data 127. System 100 may take many different forms and include multiple and/or alternate components and facilities. While an exemplary system 100 is shown in FIG. 1, the exemplary components illustrated in the figure are not intended to be limiting. Indeed, additional or alternative components and/or implementations may be used.

As illustrated in FIG. 1, system 100 includes a communications network 105. Communications network 105 may include a mixture of wired (e.g., fiber and copper) and wireless mechanisms that incorporate related infrastructure and accompanying network elements (e.g., switches, routers, gateways, hubs, service control points, service data points, service switching points, servers, databases, computing devices, transmitters, receivers, and wired lines). Illustrative communication networks include a Public Switched Telephone Network (PSTN), a Voice over Internet Protocol (VOIP) network, a cellular telephone network, and a Mobile-IP network. The communications network 105 may include multiple interconnected networks and/or sub-networks that provide communications services, including voice calling, packet-switched network services (including, for example, Internet access and/or VoIP communication services), as well as Short Message Service (SMS) messaging and Multimedia Messaging Service (MMS) messaging services, to at least one subscriber device (e.g., a mobile device, cellular telephone, laptop computer, personal digital assistant, portable music player, etc.) connected to the communications network 105.

At least a subset of the one or more network elements of the communications network 105 may record information regarding aspects of communications services rendered to one or more of the subscriber devices. This recorded information may be referred to as usage records 110. One or more usage records 110 may be produced by at least a subset of the infrastructure elements of the communications network 105, such as by a router or switch through which at least a portion of the subscriber communication may pass. The usage records 110 may accordingly be based on one or more details or aspects of the communication services provided by the particular infrastructure elements. The usage records 110 may be transported to one or more central points for aggregation and processing. Accordingly, aggregated usage records 110 may include information for each communication made by a subscriber, including for example, bandwidth usage, call duration, line usage directionality, endpoint name and location, and quality of service, among other details.

A reports server 115 may be a computing device in communication with the communications network 105, and may receive additional information regarding the communications network 105 that may not be present in the usage records 110. Exemplary additional information may include information relating to network topology, network element naming and grouping, network grouping type, network element provisioning, and blacklisted network identifiers, among other details.

The reports server 115 may receive the additional information sporadically (such as when a network configuration change takes place) or periodically (such as every four hours, on a daily basis, etc.), and may compile the received information into network activity reports 120. The reports server 115 may be configured to feed the compiled network activity reports 120 to one or more elements of the system 100. While FIG. 1 illustrates only one reports server 115, systems including multiple reports servers 115 are possible.

The system may further include a database server 125. The database server 125 may include one or more data storage mediums, devices, or configurations, and may employ various types, forms, and/or combinations of storage media, including but not limited to hard disk drives, flash drives, read-only memory, and random access memory. The database server 125 may include various technologies useful for storing and accessing any suitable type or form of electronic data, which may be referred to as content. Content may include computer-readable data in any form, including, but not limited to video, image, text, document, audio, audiovisual, metadata, and other types of files or data. Content may be stored in a relational format, such as via a relational database management system (RDBMS). As another example, content may be stored in a hierarchical or flat file system.

More specifically, the database server 125 may be configured to receive network activity reports 120 and to incorporate the network activity reports 120 into a data store including information regarding the network activity of the communications network 105. The database server 125 may thus use the received network activity reports 120 to maintain and update a relatively up-to-date store of additional information regarding the network activity reports 120. This additional information may be referred to as report data 127. The database server 125 may further allow for selective query of the report data 127 to provide access to the report data 127.

The database server 125 may further generate enrichment files 130. The enrichment files 130 may be selected from and exported out of the report data 127 compiled from the network activity reports 120. Accordingly, the enrichment files 130 may be based on the report data 127 compiled from the network activity reports 120, and may include a relatively up-to-date set of information regarding the network activity.

The system may further include a usage data server 135. The usage data server 135 may be implemented as a combination of hardware and software, and may include one or more software applications or processes configured to cause one or more computer processors to perform the operations of the usage data server 135 described herein. An enrichment process 140 may be one application included on the usage data server 135, wherein the enrichment process 140 may be implemented at least in part by instructions stored on one or more computer-readable media.

The enrichment process 140 may include instructions configured to cause the usage data server 135 to receive usage records 110 from the communications network 105 and to receive one or more enrichment files 130 from the database server 125. In some examples, the usage records 110 may be received by the usage data server 135 in substantially near real-time, and the usage data server 135 may perform one or more of aggregation, billing, and settlement operations on the usage records 110 as they are received.

The enrichment process 140 may further include instructions configured to perform enrichment of the usage records 110 through use of the enrichment file 130. The enrichment process 140 may be configured to load the enrichment files 130 onto the usage data server 135, and to enrich the usage records 110 with the data included in the enrichment files 130. These usage records 110 that are "enriched" may thus include additional data, and may be referred to as enriched records 145.

The enrichment process 140 may further be configured to store the enriched records 145 in a database such as data store 150. The data store 150 may include one or more data storage mediums, devices, or configurations, and may employ various types, forms, and/or combinations of storage media, including but not limited to hard disk drives, flash drives, read-only memory, and random access memory. The data store 150 may include various technologies useful for storing and accessing content including any suitable type or form of electronic data. The content may be stored in a relational format, such as via a RDBMS. As another example, content may be stored in a hierarchical or flat file system.

The system may further include a client 155. The client 155 may be a computing device configured to be in selective communication with the database server 125 and/or the usage data server 135. The client 155 may be implemented as a combination of hardware and software, and may include one or more software applications or processes for causing one or more computer processors to perform the operations of the client 155 described herein.

A query application 160 may be one application included on the client 155, wherein the query application 160 may be implemented at least in part by instructions stored on one or more computer-readable media. The client 155 may be configured to run a query application 160, where the query application 160 may be configured to provide access to the enriched records 145 and the report data 127 through a query front-end. The client 155 may use the query application 160 to view data, such as the report data 127, stored on the database server 125. The client 155 may further use the query application 160 to selectively query and view enriched records 145 via usage data server 135. Accordingly, a user of the query application 160 may be able to view and query the enriched records 145 according to the enriched fields added to the usage records 110, and also the report data 127 directly.

Accordingly, the query application 160 may present the user with call-specific and/or network-specific data that may not have been previously available. Further, through access to the database server 125 and/or usage data server 135, the query application 160 may provide decreased response time for issue troubleshooting, and also may allow the client 155 to gather data with regard to normal day-to-day network activities related to the network activity reports 120.

Computer-executable instructions may be compiled or interpreted from computer programs created using a variety of well known programming languages and/or technologies, including, without limitation, and either alone or in combination, Java™, C, C++, Visual Basic, Java Script, Perl, etc. The enrichment process 140 and query application 160 may thus be written according to a number of these and other programming languages and technologies, or a combination thereof.

In general, computing systems and/or devices, such as reports server 115, database server 125, usage data server 135, and client 155 may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores, such as the usage data server 135 and the data store 150 described herein, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

While FIG. 1 illustrates an exemplary system 100, other implementations may be used. In some implementations, additional elements may be included or elements shown in FIG. 1 may be omitted or modified. For example, one or more of the reports server 115, database server 125, usage data server 135, and client 155, may be combined in certain implementations. As another example, a system may include multiple reports server 115. In still further examples, enrichment process 140 may be implemented by way of multiple usage data servers 135.

Figure 2:
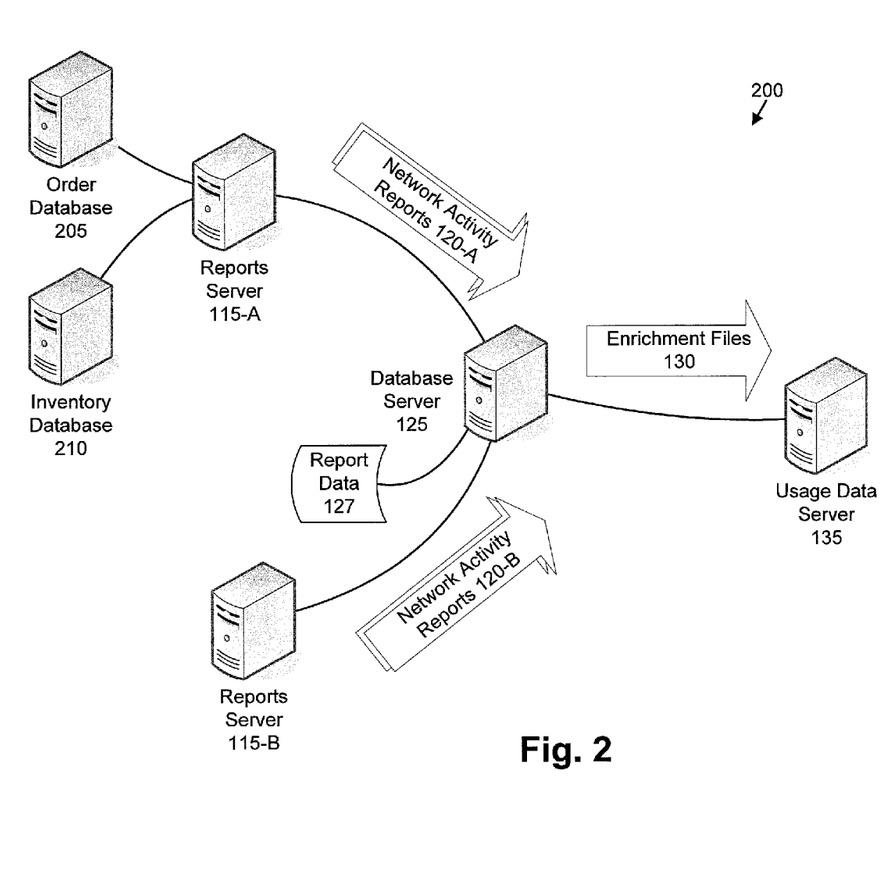
FIG. 2 illustrates a portion of an exemplary system including multiple reports servers and illustrating further details with respect to the compilation of the report data and the generation of enrichment files.

FIG. 2 illustrates a portion of an exemplary system 200 including multiple reports servers 115 and illustrating further details with respect to the compilation of the report data 127 and the generation of enrichment files 130. As shown in the Figure, a reports server 115-A may receive data from an order database 205 and an inventory database 210 and may provide network activity reports 120-A to a database server 125. Additionally, a reports server 115-B may provide network activity reports 120-B to the database server 125. The database server 125 may generate enrichment files 130 based on the received network activity reports 120. The database server 125 may provide the enrichment files 130 to a usage data server 135.

As an example, enrichment files 130 may be generated that include network configuration information. The communications network 105 may include a plurality of transmission channels between various points of the communications network 105. These channels may be referred to as trunks, and may be numbered and grouped according to location and purpose. Information related to trunks and trunk groupings may be referred to as trunking information.

An order database 205 may be a computing device configured to store trunking information, such as one or more orders used to build or provision the particular trunking on the communications network 105. An inventory database 210 may be a computing device configured to house additional trunking information and to house information over a longer period of time. A reports server 115-A may be configured to receive trunking information from the order database 205 and/or the inventory database 210 regarding changes to the connections of these trunks and trunk groups, such as whole and partial trunk group adds and disconnects. The reports server 115-A may further receive information related to the trunk group types, such as whether the trunk group is associated with an end office, a tandem switch, another communications provider, among other types of information.

The reports server 115-A may collect and aggregate this received information into network activity reports 120-A, and may send the network activity reports 120-A to the database server 125. The database server 125 may accordingly maintain report data 127 regarding current trunking information and network configuration. To keep this data current, the database server 125 may selectively receive network activity reports 120-A from the reports server 115, and may use the received network activity reports 120-A to update the stored report data 127 including a listing of the current trunking information data.

As an example, if the network activity reports 120-A indicate the addition of a new trunking group, the database server 125 may accordingly add that new trunking group to the report data 127. As another example, if the network activity reports 120-A reports the modification or deletion of an existing trunking group, the database server 125 may accordingly modify or delete that existing trunking group as stored in the report data 127. The database server 125 may then periodically create enrichment files 130 based on the updated trunking information stored in the report data 127.

Enrichment files 130 may include other types of information instead of or in addition to trunking information. As a further example, one or more devices, such as a device in selective communication with the communications network 105, may determine or otherwise collect a set of network identifiers, such as mobile device numbers (MDNs), which are associated with fraudulent communications over the communications network 105.

The reports server 115-B may collect and aggregate the information regarding blacklisted network identifiers into network activity reports 120-B, and may send the network activity reports 120-B to the database server 125. The database server 125 may maintain report data 127 including a current list of blacklisted network identifiers. To keep the data current, the database server 125 may further receive network activity reports 120-B from the reports server 115-B, and may use the received network activity reports 120-B to update the list of blacklisted network identifiers included in the report data 127.

As an example, if the network activity reports 120-B indicate the addition of a new identifier to be blocked, the database server 125 may accordingly add that network identifier to the list of blocked network identifiers in the report data 127. As another example, if the network activity reports 120-A reports the removal of a network identifier from the list of blocked identifiers, the database server 125 may accordingly delete that existing network identifier from the list of blocked network identifiers stored in the report data 127. The database server 125 may further create an enrichment file 130 based on the list of blacklisted network identifiers stored in the report data 127.

Enrichment files 130, such as the exemplary enrichment files 130 discussed above, may be used by the enrichment process 140 to enrich usage records 110 with the additional information, such as trunking information and blacklisted network identifiers included in the enrichment files 130.

Figure 3:
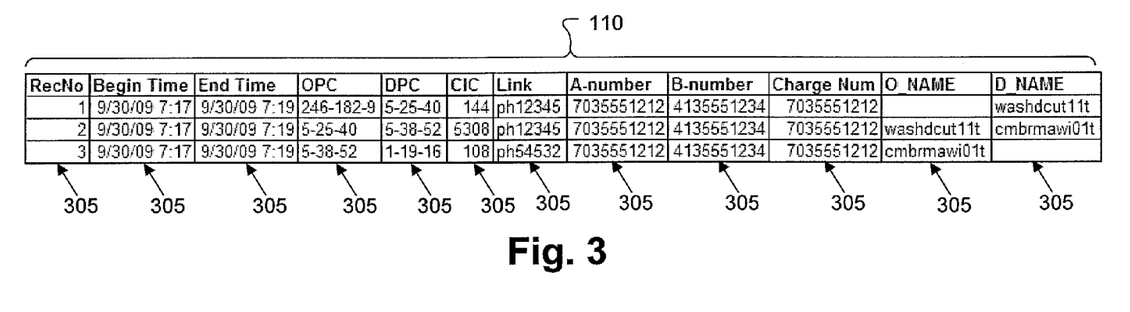
FIG. 3 illustrates exemplary usage records that may be received by usage data server from a communications network.

FIG. 3 illustrates exemplary usage records 110 that may be received by usage data server 135 from a communications network 105. As illustrated in FIG. 3, the exemplary usage records 110 may take the form of call data records generated by a communications network. While the concepts in the following figures are described in terms of signaling system 7 (SS7) call data records, these concepts are equally applicable to other networking environments, such as VOIP networks, and should not be considered to be limited to or otherwise directed solely to SS7 call data records or to communications systems that utilize SS7 call data records.

A usage record 110 may include a plurality of fields 305, wherein each field 305 may include a particular type or element of data. As some examples, a usage record 110 may include a unique record number field 305 to identify the particular usage record 110, a begin time field 305 indicating the time of the start of the communication, and an end time field 305 indicating the time of the conclusion of the communication.

The usage record 110 may further include addresses of one or both of the origination device and destination device of a communication represented by the usage record 110. Exemplary addresses may include signaling system 7 (SS7) point code addresses for a telecommunications network, and internet protocol (IP) addresses in an IP network. As shown, the usage records 110 may include an originating point code (OPC) field 305 indicating an origination address for a communication and a destination point code (DPC) field 305 indicting a destination address for the communication.

The usage record 110 may also include a trunk circuit (CIC or TCIC) field 305 including an identifier associated with a particular TCIC over which the communication traveled. The usage record 110 may include an A-number field 305 indicated a origination number for the communication, a B-number field 305 indicating a destination number for the communication, and a charge number field 305 indicating a number to which to bill the communication.

A communication may include a plurality of legs, or discrete segments, that make up the path from a source to a destination for the call. Each leg of the communication may be represented by a usage record 110, where each usage record 110 may include a plurality of fields 305. The usage record 110 may include an origination name field 305 indicating a name for an origination for a call leg, and a destination name field 305 indicating a name for a destination for a call leg.

For example, three exemplary usage records 110 are shown in FIG. 3, each representing one leg of a three-leg communication from an A-number of "703-555-1212" to a B-number of "413-555-1234." The first leg of the communication may be from an origination point code (OPC) of "246-182-9" to a destination point code (DPC) of "5-25-40," the second leg may be from the OPC of "5-25-40" to a DPC of "5-38-52," and the third leg may be from the OPC of "5-38-52" to the DPC of "1-19-16."

In some examples, one or more of the exemplary fields 305 shown in the usage records 110 may be combined together or omitted. In some examples additional fields 305 not illustrated may be included in the usage records 110. While only three usage records 110 and usage records 110 for only one communication are shown in FIG. 3, in many examples many usage records 110 for many communications between subscribers may be included in the usage records 110.

Figure 4:
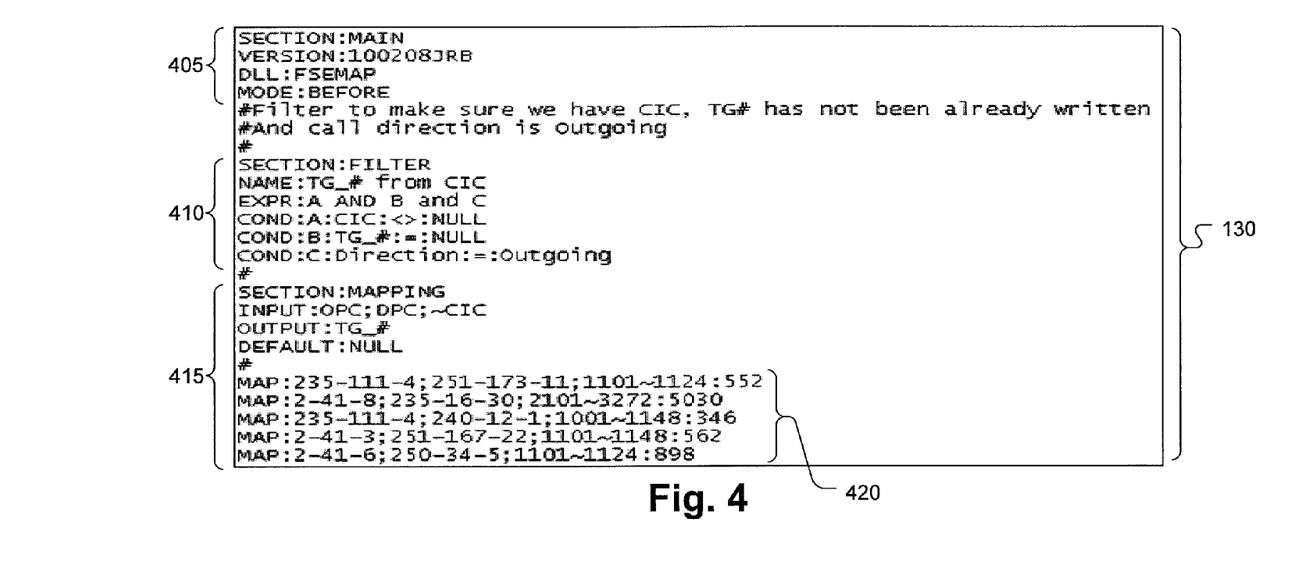
FIG. 4 illustrates an exemplary enrichment file.

FIG. 4 illustrates an exemplary enrichment file 130. As illustrated, the exemplary enrichment file 130 may include header information 405, filter information 410, and mapping information 415 including a listing of mappings 420.

The header information 405 of the enrichment file 130 may specify general information regarding the contents of the enrichment file 130. For example, the header information 405 may include a version of the enrichment file 130, a name of the enrichment file 130, and a data source from which the data included in the enrichment file 130 may have originated or have been compiled.

The filter information 410 may specify information that may be used to filter a set usage records 110 down to a subset of records that may be applicable for the particular enrichment file 130. The filter information 410 may accordingly allow for a query of the usage records 110 to be performed, so that the enrichment file 130 may only be used to map to a set of relevant usage records 110, excluding usage records 110 that lack the requisite input fields 305.

For example, the filter information 410 may include a logical expression including one or more conditions to evaluate for each usage record 110, where the usage record 110 must satisfy the expression to be considered for mapping. Exemplary conditions may include ensuring that a particular field 305 of a usage record 110 is non-null (i.e., includes an input value to use to determine a value to populate into a usage record 110), ensuring that a particular field 305 of a usage record 110 is null (i.e., is empty and available to receive a mapped value), and ensuring that a particular field 305 of a usage record 110 includes a specified value or range of values. An exemplary logical expression may then be used to determine a true or false value according to the one or more specified conditions. The filter information 410 may further include a name specifying the purpose of the expression and conditions included in the filter information 410.

The mapping information 415 may include a listing of mappings 420, and may specify values to be used to populate specified output fields 305 of a usage record 110 from a set of input values of a usage record 110. The mapping information 415 may further specify a default value to include in a field 305 of the usage records 110 if no explicit mapping exists in the listing of mappings 420 for certain input values.

The mapping information 415 may specify a listing of mappings 420 derived from the report data 127. For example, the report data 127 may include a mapping of trunk group numbers according to origination point code, destination point code, and trunk circuit number. At least a subset of this information may be retrieved from the report data 127, such as by the database server 125, and may be included in an enrichment file 130 in the specified input and output format.

The mapping information 415 may further include an input format that may be used for the listing of mappings 420, an output field 305 into which the resultant mapped value may be placed, and a default value to include in the output field 305 if no entry in the mappings 420 exists. Each item of the listing of mappings 420 may confirm to the input format, and may specify a value to be included in the specified output field 305 for a set of input criteria in the input format. The input format may thus serve as a template for each list item in the list of mappings 420, and may indicate the order of the field 305 values in the mappings 420, as well as whether the value for a field 305 is a specific value or a specific range of values.

As an example, the mapping information 415 of the enrichment file 130 may indicate that an origination point code field 305 including the value of "235-111-4," a destination point code field 305 including the value of "251-173-11," and a trunk circuit field 305 including values from "1101" through "1124" may be associated with a the trunk group number value of "552."

Figure 5:
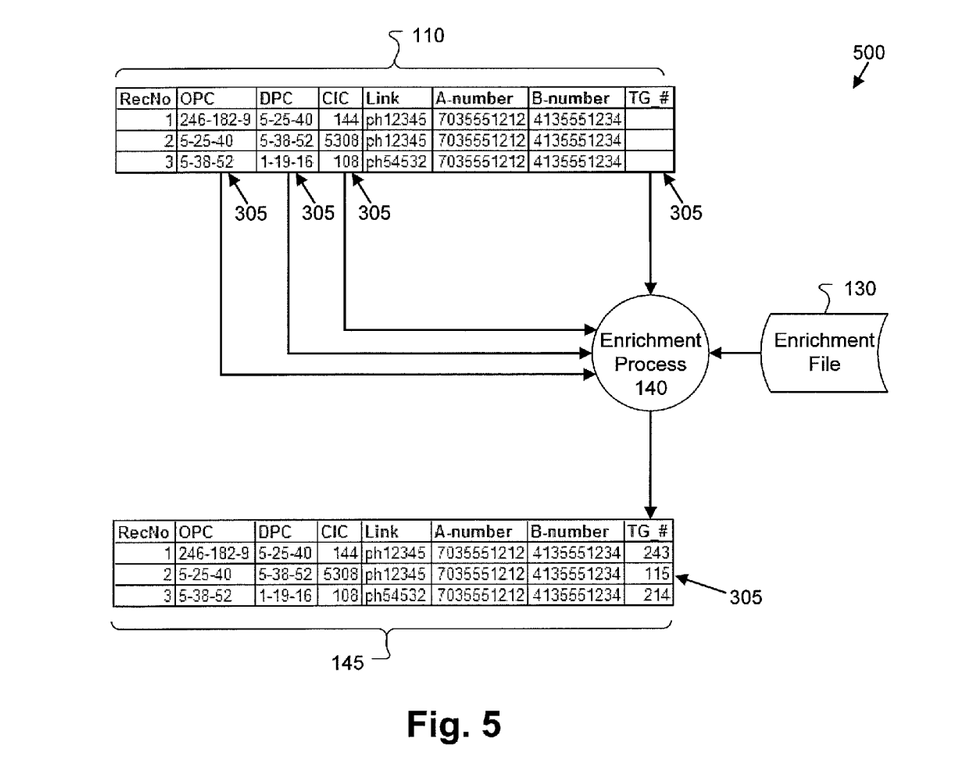
FIG. 5 illustrates an exemplary process flow for adding an additional field to a set of usage records according to an enrichment file.

FIG. 5 illustrates an exemplary process flow 500 for populating an additional field 305 of a set of usage records 110 according to an enrichment file 130. In some instances, the process flow 500 may be performed by the enrichment process 140 as executed by the usage data server 135. As shown in the FIG. 5, the enrichment process 140 may utilize an exemplary enrichment file 130, similar to the one as discussed above with regard to FIG. 4, to populate an additional field 305 of exemplary usage records 110, such as usage records 110 similar to those illustrated above with regard to FIG. 3.

The enrichment process 140 may be configured to filter at least a portion of the received usage records 110 based on the received enrichment files 130 and may be further configured to utilize mapping information 415 included in the enrichment files 130 to populate one or more fields 305 in the usage record 110 with additional information. Accordingly, the enrichment process 140 may be configured to "enrich" the usage records 110, resulting in a set of enriched records 145.

An exemplary set of usage records 110 may include an empty field 305 (i.e., the trunk group number TG_# field 305) that may be populated according to the mapping information 415 included in the enrichment file 130. It should be noted that in some instances, the enrichment process 140 may be configured to add an additional field into which to place the additional information if the additional field is not included.

The enrichment process 140 may be configured to populate usage records 110 into enriched records 145 that are "enriched" through inclusion of data used to populate the trunk group number field 305. As an example, the enrichment file 130 may indicate that for a usage record 110 having origination point code field 305 including the value of "246-182-9," a destination point code field 305 including the value of "5-25-40," and a trunk circuits field 305 value of "144," the TG_# field 305 may be populated with a value of "243." The enrichment process 140 may therefore be configured to populate the TG_# field 305 with "243" according to the mapping information 415 of the enrichment file 130.

The enrichment process 140 may optionally be configured to apply one or more additional enrichment files 130 to the enriched records 145. In some examples, enrichment files 130 may depend on additional fields 305 added by other enrichment files 130. Accordingly, to allow for these dependencies, in some instances the enrichment files 130 may include a reference number, such as a sequence number including leading numeric values, to allow for the enrichment files 130 to be processed in their numeric order. Once the enrichment operations are complete, the enrichment process 140 may be configured to store the enriched records 145 in the data store 150.

Figure 6:
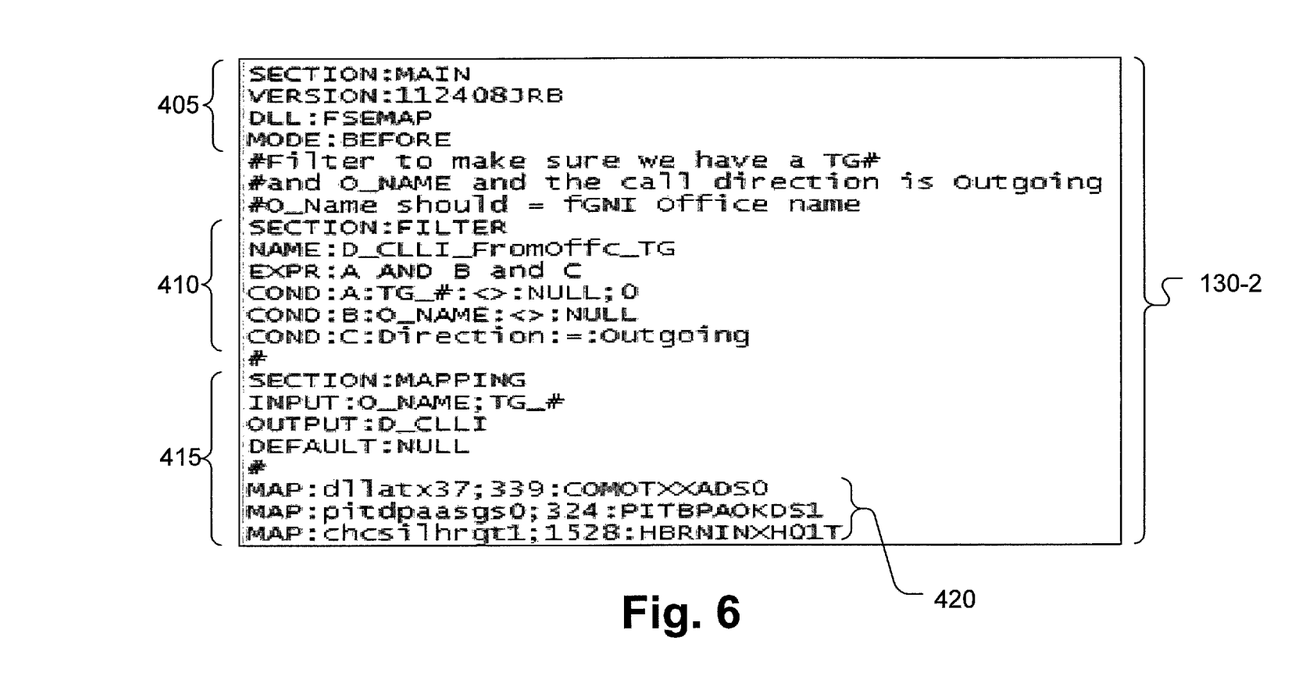
FIG. 6 illustrates an exemplary enrichment file that depends from another enrichment file.

FIG. 6 illustrates an exemplary second enrichment file 130-2 that depends from a first enrichment file 130. A set of usage records 110 may lack a particular field 305, but that field 305 may be added by way of the enrichment process 140 through use of the first enrichment file 130. The exemplary second enrichment file 130-2 may be configured to add additional information to usage records 110 based on a field added by way of the first enrichment file 130.

As shown in FIG. 6, the filter information 410 of the second enrichment file 130-2 may include a condition dependent on trunk group number being non-null (i.e., including a value) so that it may be used as an input to a listing of mappings 420 in the mapping information 415. This trunk number field 305 may accordingly have been added to the usage records 110 by way of the enrichment process 140 through use of a first enrichment file 130. This may be ensured by including a sequence number in the enrichment file 130-2 that is higher than a sequence number included in the first enrichment file 130. Accordingly, this second enrichment file 130-2 may be used to further "enrich" the enriched records 145, but only after the usage records 110 have already been enriched to include trunk number field 305.

More specifically, the second enrichment file 130-2 may include information that may be used to add values to a destination common language location identifier (CLLI) field 305 according to an origin name field 305 and a trunk group number field 305. As an example, the enrichment file 130-2 may indicate that for an origin name field 305 including a value of "dllatx37" and a trunk group number field 305 including a value of "339," the destination CLLI field 305 may be indicated to be "COMOTXXADS0." As another example, the enrichment file 130-2 may indicate that for an origin name field 305 having a value of "pitdpaasgs0" and a trunk group number field 305 having a value of "324," the destination CLLI field 305 may be indicated to be "HBRNINXH0IT."

Figure 7:
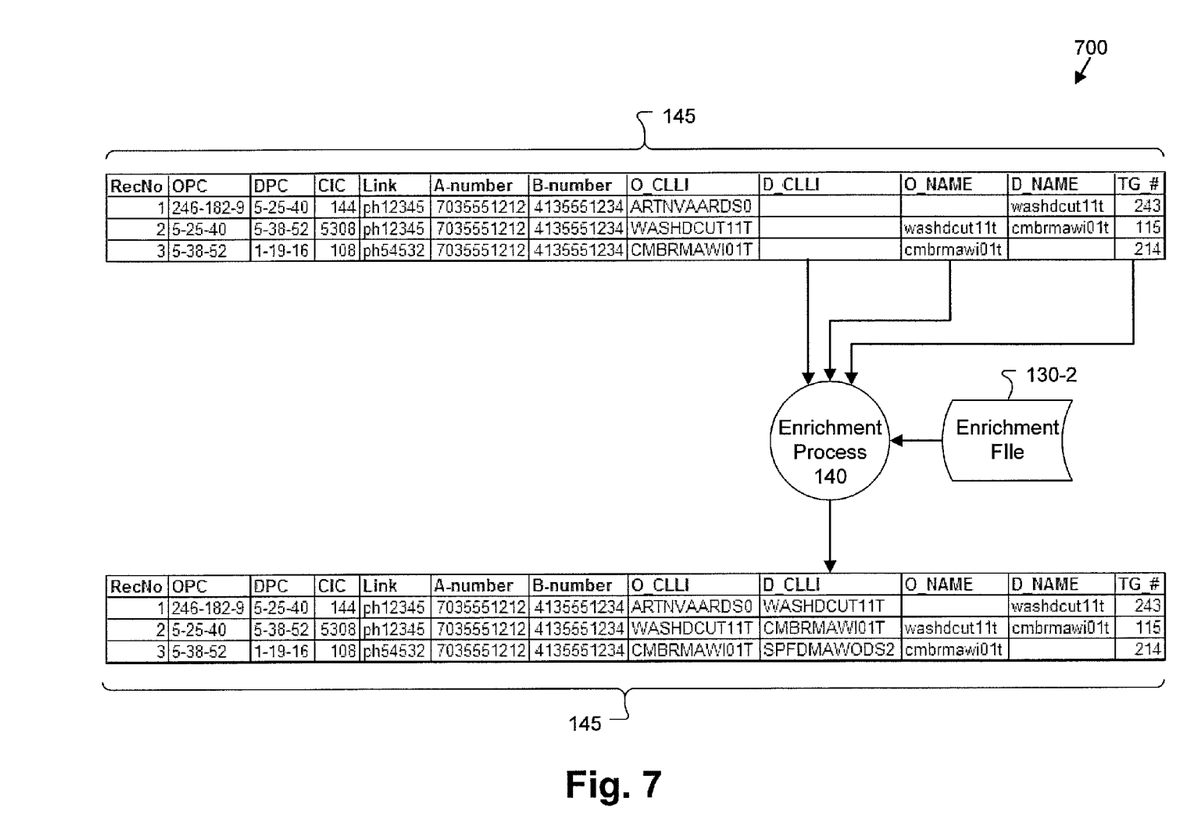
FIG. 7 illustrates an exemplary process flow for adding an additional field to a set of enriched records according to a second enrichment file.

FIG. 7 illustrates an exemplary process flow 700 for adding an additional field 305 to a set of enriched records 145 according to a second enrichment file 130-2. The enrichment process 140 may utilize an exemplary enrichment file 130-2, such as the one illustrated in FIG. 5, to map an additional field 305 into enriched records 145 similar to how the enrichment process 140 may map additional fields 305 into usage records 110.

For example, an exemplary set of enriched records 145 may be filtered by way of the enrichment process 140 to include enriched records 145 that have an empty destination CLLI field 305 (i.e., the D_CLLI field 305), and values for origin name field 305 and trunk group number field 305. Data to be added to the D_CLLI field 305 may accordingly be added by way of the enrichment file 130-2.

The enrichment file 130-2 may include a mapping from an origin name field 305 and a trunk group number field 305 to a destination CLLI field 305. The enrichment process 140 may accordingly be configured to filter based on filter information 410 in the enrichment file 130. The enrichment process 140 may be configured to determine that, for each record in the enriched records 145, the record include values for the origin name field 305 and the trunk group number field 305, while also having no value for the destination CLLI field 305.

If the enrichment process 140 determines that these conditions are satisfied then enrichment process 140 may be configured to determine a value for the destination CLLI field 305 by comparing the origin name field 305 and trunk group number field 305 specified in the enriched record 145 against the mappings indicated in the listing of mappings 420 in the mapping information 415 of the second enrichment file 130-2. If the enrichment process 140 locates a matching value in the listing of mappings 420, then the enrichment process 140 may be configured to populate the destination CLLI field 305 of the record with the located value. Otherwise, the enrichment process 140 may be configured to populate a default value into the enriched records 145, such as the default value specified in the mapping information 415 of the second enrichment file 130-2. Thus, the enrichment process 140 may further "enrich" the enriched records 145 to include a populated destination CLLI field 305.

Once the usage records 110 have been enriched by the enrichment process 140 and one or more enrichment files 130, the enriched records 145 may be stored in the data store 150 and made available for further access and query, such as by a query application 160 executed by a client 155.

For example, a client 155 may be in communication with the data store 150 and may include a query application 160 configured to query the enriched records 145 stored in the data store 150. The query application 160 may be configured to query according to one or more fields 305 of the enriched records 145, including the additional fields 305 added to the enriched records 145 by way of the enrichment process 140. Thus, the additional fields 305 may be used both to selectively specify records to query and also to be received in response to a query. Accordingly, additional information regarding the usage records 110 may be obtained and viewed that may not have been available otherwise.

As an example, usage records 110 may be enriched with an enrichment file 130 including set of network identifiers associated with fraudulent communications over the communications network 105. A client 155 may then query the enriched records 145 for any records that are indicated as including a blocked network identifier. If any communications completed with regard to any blocked identifiers, then these records may appear in query results and may accordingly identify incidences of fraud block escapees.

Moreover, the query application 160 may further be configured to query the report data 127 used to compile the enrichment files 130 used by the enrichment process 160 to enrich the usage records 110.

Figure 8:
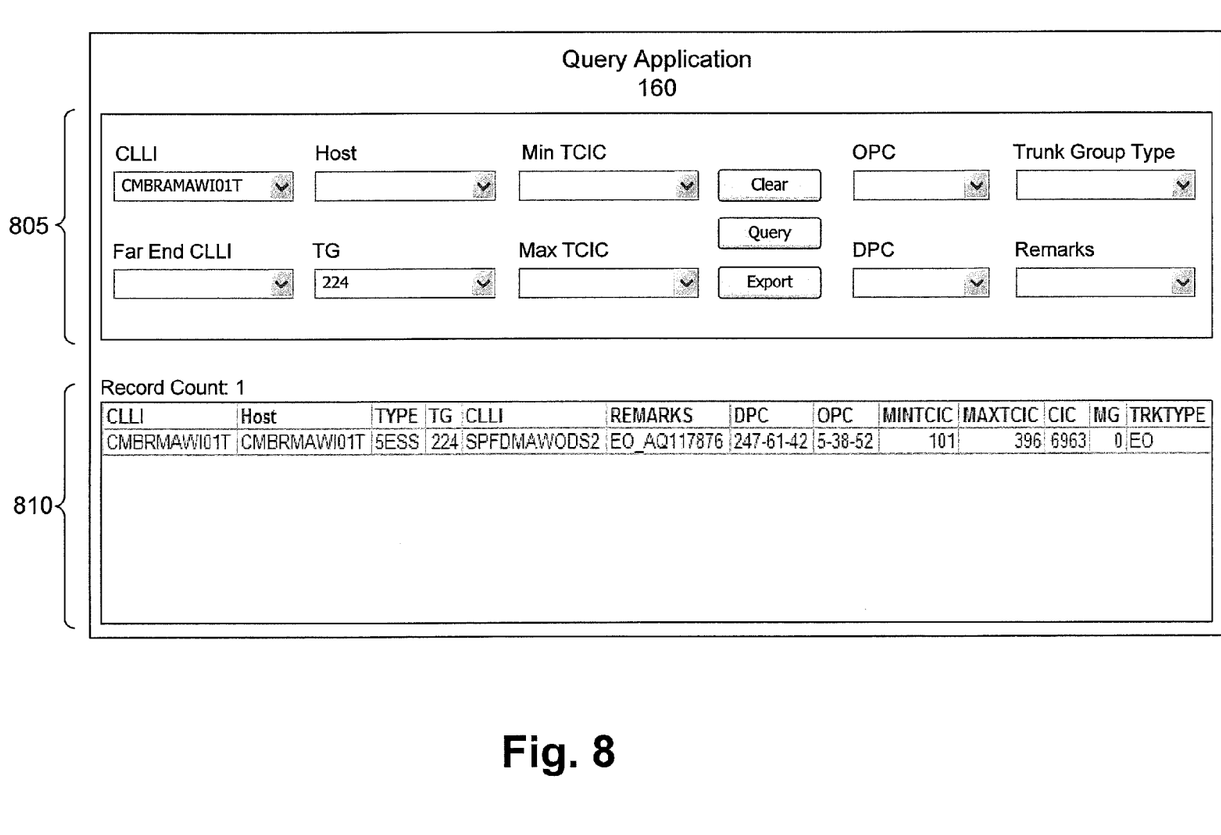
FIG. 8 illustrates an exemplary view of a query application configured to query exemplary report data.

FIG. 8 illustrates an exemplary view of a query application 160 configured to query exemplary report data 127. The query application 160 may be configured to perform queries against the report data 127 stored by the database server 125, where each query may include one or more query parameters 805. The query application 160 may be further configured to receive query results 810 from the database server 125 responsive to the queries. Thus, through use of the query application 160, a communications provider may receive information from substantially the same report data 127 that may be used to enrich the usage records 110.

The query application 160 may be configured to query report data 127 that may be stored by the database server 125 according to a set of query parameters 205. Query parameters 805 may thus include one or more criteria that may be searched for by way of a database query. Based on the query parameters 805, the query application 160 may be configured to generate a database query, such as a SQL select statement. Exemplary query parameters 805 may include information relating to the data stored in the report data 127 by the database server 125.

As an example, the query application 160 may be configured to perform queries against report data 127 including trunking information. Exemplary query parameters 805 with regard to trunking information may include a CLLI field 305, a far end CLLI field 305, a host field 305, a trunk group number field 305, a minimum TCIC number field 305, a maximum TCIC number field 305, an origin point code field 305, a destination point code field 305, a trunk group type field 305, and a remarks field 305. While these exemplary fields 305 are shown in the figure, more, fewer, or alternate fields 305 are possible and likely. It should be noted that the query application 160 may receive query parameters 805 relating to fields 305 that are similar to those additional fields 305 added to the enriched records 145 by way of the enrichment files 130 generated from the report data 127.

The query application 160 may be configured to send the query based on the query parameters 805 to the database server 125, such as when a user clicks a query button on the query application 160. The database server 125 may be configured to produce a set of zero or more query results 810 from stored report data 127 based on the query parameters 805. These query results 810 may be received by the query application 160. The query application 160 may be configured to display at least a portion of the received query results 810.

For example, as shown in FIG. 8, a user may enter a query parameter 805 for a CLLI of "CMBRAMAWI01T" and a trunk group of "224" into the query application 160. The user may select the query button to initiate the query function. The query application 160 may according perform the query against report data 127 stored by the database server 125, and may receive and display the query results 810 received from the database server 125 in response. The query results 810 as shown may include detailed information about an indicated switch and trunk group that may not otherwise have been available to a user.

A user may perform other various queries to the database server 125 with varied query parameters 805, to allow the user to gather information regarding other switches and trunk groups. Accordingly, through use of the query application 160 and the report data 127 stored by the database server 125, a communications provider may have access to network specific data that may not have been previously available, or that that may have taken the user a long time to find without aid of the query application 160 and report data 127.

Figure 9:
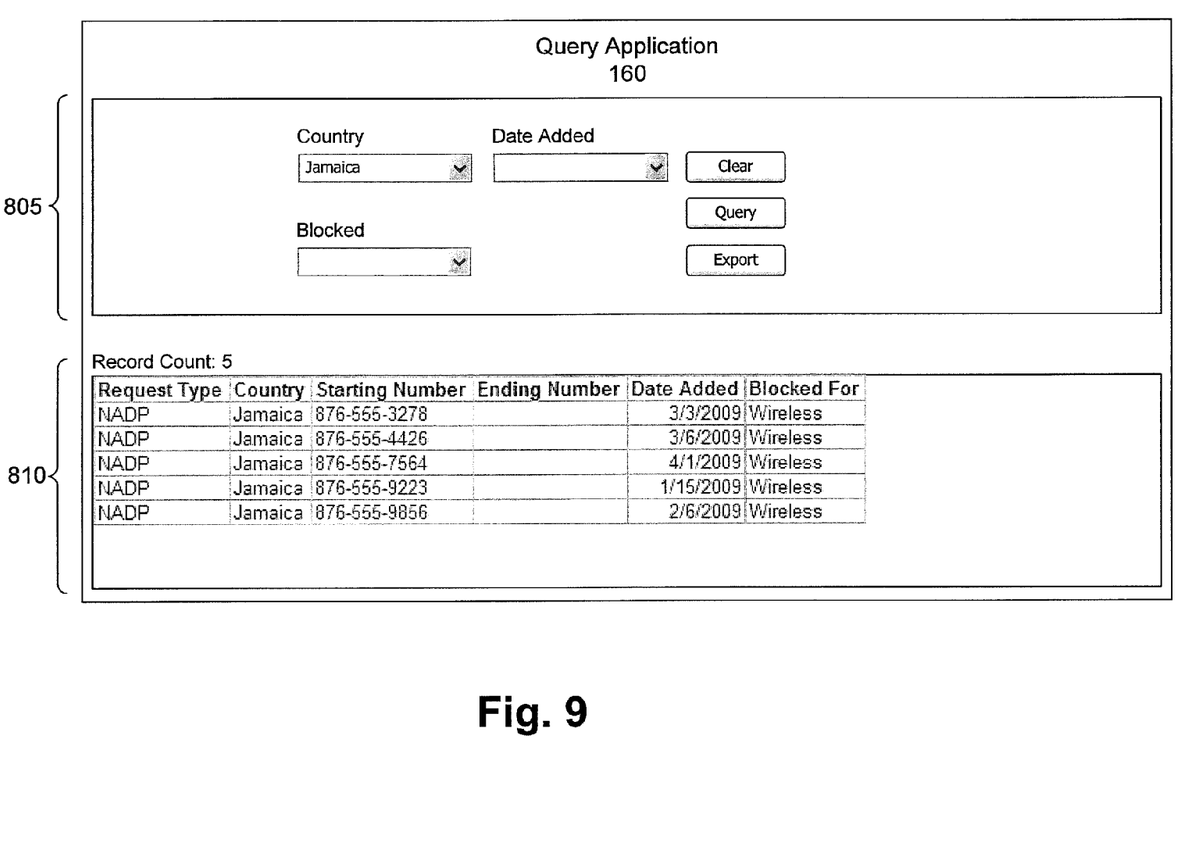
FIG. 9 illustrates an exemplary view of a query application configured to query alternate exemplary report data.

FIG. 9 illustrates an exemplary view of a query application 160 configured to query alternate exemplary report data 127. As an alternate example, the query application 160 may be configured to queries against the report data 127 including blacklisted network identifiers. Thus, through use of the query application 160, a communications provider may facilitate the identification any instances of fraudulent use of the communications network by way of substantially the same report data 127 that may be used to enrich the usage records 110.

Exemplary query parameters 805 with regard to blacklisted network identifiers may include a country of origin, a date added to a blocked list, and a type of service being blocked. It should be noted that the query application 160 may receive query parameters 805 relating to fields 305 that are similar to those additional fields 305 added to the enriched records 145 by way of the enrichment files 130 generated from the report data 127.

For example, as shown in FIG. 9, a user may enter a query parameter 805 for a country of "Jamaica" into the query application 160. The user may select the query button. The query application 160 may according perform the query against report data 127 stored by the database server 125, and may receive and display the query results 810 received from the database server 125 in response. The query results 810 as shown may include a list of detailed information regarding the list of blacklisted network identifiers originating from the country of "Jamaica."

Figure 10:
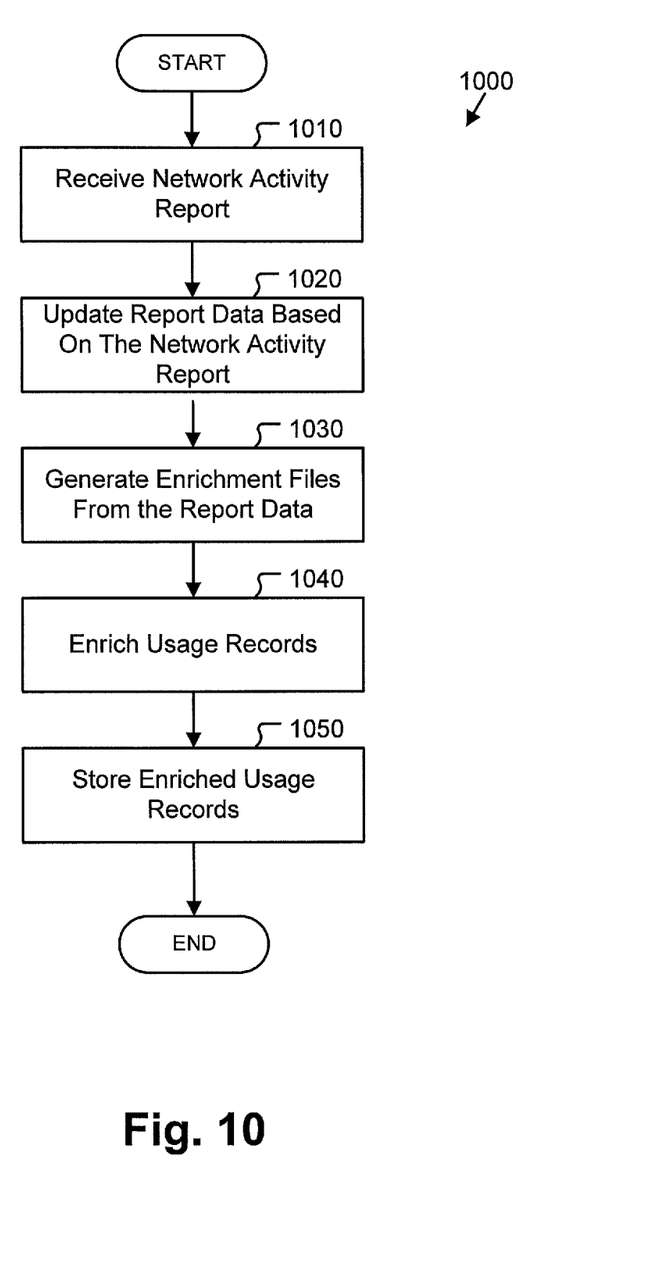
FIG. 10 illustrates an exemplary process flow for enriching usage records into enriched records using report data.

FIG. 10 illustrates an exemplary process flow 1000 for enriching usage records 110 into enriched records 145 using report data 127.

In block 1010, the database server 125 receives network activity reports 120. For example, one or more a reports servers 115 may be configured to provide network activity reports 120 to the database server 125. The database server 125 may accordingly be configured to receive the network activity reports 120.

In block 1020, the database server 125 updates a database according to the received network activity reports 120. For example, the database server 125 may be configured to receive network activity reports 120 and to incorporate the network activity reports 120 into a data store including information regarding the network activity of the communications network 105. The database server 125 may thus use the received network activity reports 120 to maintain and update a relatively up-to-date store of additional information regarding the network activity reports 120. The database server 125 may further allow for selective query of the stored network activity of the communications network 105 to provide access to the stored network activity data.

As an example, the database server 125 may maintain data regarding current trunking information and network topology. To keep this data current, the database server 125 may selectively receive network activity reports 120 from the reports server 115, and may use the received network activity reports 120 to update the stored trunking information data. As another example, the database server 125 may maintain a current list of blacklisted network identifiers. To keep the data current, the database server 125 may further receive network activity reports 120 from a reports server 115, and may use the received network activity reports 120 to update the list of blacklisted network identifiers In block 1030, the database server 125 generates at least one enrichment file 130. The enrichment files 130 may be selected from and exported out of the store of additional information regarding the network activity reports 120. Accordingly, the enrichment files 130 may be based on information included in the network activity reports 120, and may include a relatively up-to-date set of information regarding the network activity. As an example, the database server 125 may periodically create enrichment files 130 including the updated trunking information. As another example, the database server 125 may create an enrichment file 130 including the list of blacklisted network identifiers.

In block 1040, the enrichment process 140 enriches usage records 110 based on the at least one enrichment file 130. For example, a usage data server 135 may include an enrichment process 140 configured to receive usage records 110 from the communications network 105 and to receive enrichment files 130 from the database server 125. The enrichment process 140 may further be configured to enrich the usage records 110 to create enriched records 145 using the enrichment files 130.

In block 1050, the enrichment process 140 stores the enriched records 145 onto data store 150. Next, the process 1000 ends.

Figure 11:
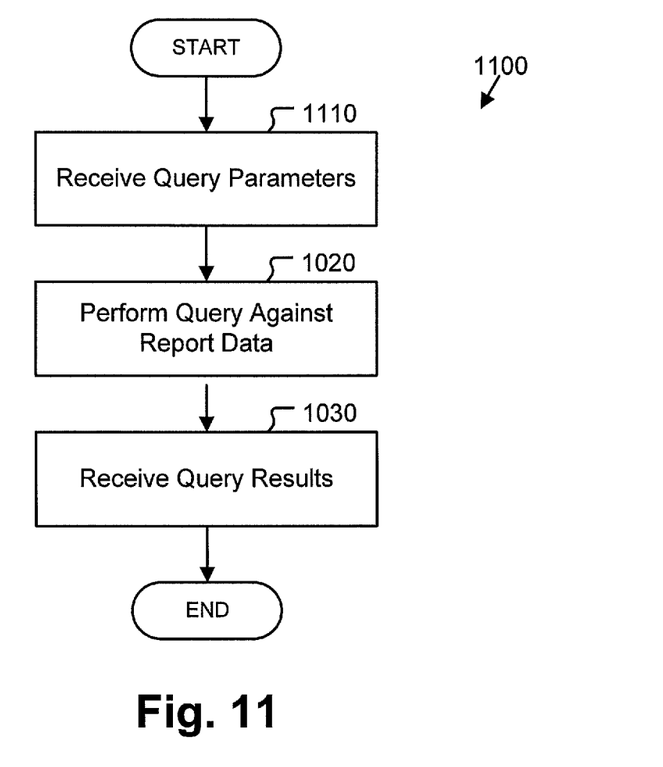
FIG. 11 illustrates an exemplary process flow for querying report data.

FIG. 11 illustrates an exemplary process flow 1100 for querying report data.

In block 1110, the query application 160 received a set of one or more query parameters 805. For example, query parameters 805 may include one or more criteria that may be searched for by way of a database query. Exemplary query parameters 805 with regard to network configuration may include a CLLI field 305, a far end CLLI field 305, a host field 305, a trunk group number field 305, a minimum TCIC number field 305, a maximum TCIC number field 305, an origin point code field 305, a destination point code field 305, a trunk group type field 305, and a remarks field 305. Exemplary query parameters 805 with regard to blacklisted network identifiers may include a country of origin, a date added to a blocked list, and a type of service being blocked.

In block 1120, the query application 160 performs a query against report data 127. The query application 160 may be configured to send the query based on the query parameters 805 to the database server 125, such as when a user clicks a query button on the query application 160. The database server 125 may be configured to produce a set of zero or more query results 810 from stored report data 127 based on the query parameters 805.

In block 1130, the query application 160 receives query results 810. For example, query results 810 may be received by the query application 160 from the database server 125. The query application 160 may be configured to display at least a portion of the received query results 810. Next the process 1100 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
    a database server configured to store at least one enrichment file; and
    a usage data server executing an enrichment process configured to:
        receive a plurality of usage records, each of said plurality of usage records including a plurality of fields of recorded information regarding aspects of communications services rendered to subscriber devices over a communications network;
        receive an enrichment file from said database server including network configuration information regarding said communications network, said enrichment file including mapping information derived from report data specifying values to be used to populate at least one additional field of said plurality of usage records based on at least a subset of said plurality of fields of said plurality of usage records, and wherein said mapping information may further specify a default value to include in said at least one additional field if no explicit mapping exists for a certain input value; and
        enrich at least a portion of said usage records by populating at least one additional field in said portion of said usage records with values according to said mapping information included in said enrichment file.

2. The system of claim 1, wherein said database server is further configured to:
    receive network activity reports;
    compile said report data according to said received activity reports; and
    generate enrichment files according to said compiled report data.

3. The system of claim 1, wherein said enrichment process is further configured to:
    filter at least a portion of said received usage records based on filter information included in said enrichment file.

4. The system of claim 1, wherein said enrichment file includes a set of network identifiers associated with fraudulent communications over the communications network, and said enrichment process is further configured to populate at least one field in at least one of said usage records to include an indication of whether said at least one usage record is associated with a fraudulent communication.

5. The system of claim 1, further comprising a client including a query application configured to:
    send a query to said database server, said query including at least one query parameter; and
    receive at least one query result from said database server responsive to said query.

6. The system of claim 5, wherein said query application is further configured to display said at least one query result.

7. The system of claim 5, wherein said at least one query parameter identifies a network switch, and wherein said at least one query result includes information regarding said network switch.

8. The system of claim 7, wherein said information regarding said network switch includes at least one field populated with trunking information by said enrichment process according to said enrichment file.

9. The system of claim 1, further comprising a data store configured to selectively store and retrieve enriched records, wherein said enrichment process is further configured to store said enriched records in said data store.

10. The system of claim 9, further comprising a client including a query application configured to query said enriched records in said data store according to at least one query parameter.

11. The system of claim 10, wherein at least one of said query parameters is configured to selectively query records according to a field populated with data by said enrichment process according to said enrichment file.

12. The system of claim 1, wherein said network activity reports include at least one of trunking information and network identifiers associated with fraudulent communications.

13. The system of claim 1, wherein said enrichment process is further configured to:
    receive a second enrichment file from said database server including additional network configuration information regarding said communications network, said second enrichment file including mapping information specifying values to be used to populate at least one additional field of said plurality of usage records based on at least a second subset of said plurality of fields of said plurality of usage records; and
    enrich at least a portion of said usage records by populating at least one additional field in said portion of said usage records with values according to said mapping information included in said second enrichment file.

14. The system of claim 13, wherein said enrichment file includes first sequence number and said second enrichment file includes a second sequence number, and said enrichment file and said second enrichment file are used to enrich at least a portion of said usage records ordered according to said first and second sequence numbers.

15. A method, comprising:
    receiving a plurality of usage records, each of said plurality of usage records including a plurality of fields of recorded information regarding aspects of communications services rendered to subscriber devices over a communications network;
    receiving at least one enrichment file from a database server including network configuration information regarding said communications network, said enrichment file including mapping information derived from report data specifying values to be used to populate at least one additional field of said plurality of usage records based on at least a subset of said plurality of fields of said plurality of usage records, and wherein said mapping information may further specify a default value to include in said at least one additional field if no explicit mapping exists for a certain input value; and enriching at least a portion of the plurality usage records by populating at least one additional field in said portion of said usage records with values according to said mapping information included in said at least one enrichment file.

16. The method of claim 15, further comprising:

filtering at least a portion of the received usage records based on filter information included in the at least one received enrichment file.

17. The method of claim 15, further comprising:

receiving network activity reports;

compiling the report data according to the received activity reports; and generating enrichment files according to the compiled report data.

18. The method of claim 15, further comprising:

sending a query to the database server, the query including at least one query parameter; and receiving at least one query result from the database server responsive to the query.

19. The method of claim 18, further comprising displaying the at least one query result.

20. A non-transitory computer-readable medium tangibly embodying computer-executable instructions comprising:

receiving a plurality of usage records, each of said plurality of usage records including a plurality of fields of recorded information regarding aspects of communications services rendered to subscriber devices over a communications network;

receiving at least one enrichment file including network configuration information regarding said communications network, said enrichment file including mapping information derived from report data specifying values to be used to populate at least one additional field of said plurality of usage records based on at least a subset of said plurality of fields of said plurality of usage records, and wherein said mapping information may further specify a default value to include in said at least one additional field if no explicit mapping exists for a certain input value; and enriching at least a portion of the plurality of usage records by populating at least one additional field in said portion of said usage records with values according to said mapping information included in said at least one enrichment file.

21. The non-transitory computer-readable medium of claim 20, further comprising:

filtering at least a portion of the received usage records based on filter information included in the at least one received enrichment file.

22. The non-transitory computer-readable medium of claim 20, further comprising:

receiving network activity reports;

compiling the report data according to the received activity reports; and generating enrichment files according to the compiled report data.

23. The non-transitory computer-readable medium of claim 20, further comprising:

sending a query to the database server, the query including at least one query parameter; and receiving at least one query result from the database server responsive to the query.

24. The system of claim 13, wherein said at least a second subset of said plurality of fields includes at least one field enriched by populating with values according to said mapping information included in said enrichment file.

* * * * *